(12) United States Patent
Asano et al.

(10) Patent No.: US 11,033,810 B2
(45) Date of Patent: Jun. 15, 2021

(54) INTERFACE SYSTEM, PROGRAM AND CONTROL METHOD FOR LOCATION GAME

(71) Applicant: DWANGO Co., Ltd., Tokyo (JP)

(72) Inventors: Kazuya Asano, Tokyo (JP); Toyokazu Tsugehara, Tokyo (JP)

(73) Assignee: DWANGO CO., LTD.

( * ) Notice: Subject to any disclaimer, the term of this patent is extended or adjusted under 35 U.S.C. 154(b) by 0 days.

(21) Appl. No.: 16/625,434

(22) PCT Filed: Oct. 31, 2018

(86) PCT No.: PCT/JP2018/040522
§ 371 (c)(1),
(2) Date: Dec. 20, 2019

(87) PCT Pub. No.: WO2019/088173
PCT Pub. Date: May 9, 2019

(65) Prior Publication Data
US 2020/0384351 A1    Dec. 10, 2020

(30) Foreign Application Priority Data

Oct. 31, 2017   (JP) .............................. JP2017-210584

(51) Int. Cl.
*A63F 13/65*    (2014.01)
*A63F 13/216*   (2014.01)
(Continued)

(52) U.S. Cl.
CPC ........ *A63F 13/216* (2014.09); *A63F 13/5372* (2014.09); *A63F 13/65* (2014.09);
(Continued)

(58) Field of Classification Search
CPC ................. G06T 2215/16; A63F 13/06; A63F 2300/5573; A63F 2300/69; A63F 2300/807; A63F 2300/8082
See application file for complete search history.

(56) References Cited

U.S. PATENT DOCUMENTS 5,150,908 A    9/1992  Codinha
9,782,668 B1   10/2017 Golden et al.

FOREIGN PATENT DOCUMENTS

CN    1366465 A     8/2002
CN    101911128 A   12/2010
(Continued)

OTHER PUBLICATIONS

Japanese style RPG of the flume logic which can also enjoy the escape game using Intl Pub No. WO2017/090272 map info, and treasure hunting 8 million Qwest 3, in the spring of 2017, URL, and http://www.4gamer.net/games/369/G036981/20170126076/.
(Continued)

*Primary Examiner* — Lawrence S Galka
(74) *Attorney, Agent, or Firm* — Bracewell LLP; Douglas F. Stewart; Patrick J. Connolly

(57) ABSTRACT

The present invention is provided with: a virtual display data generating unit which generates fantasy blocks according the progress of a game accompanied by the movement of a user; a synthesis processing unit which superimposes the generated fantasy blocks on a real map and displays the superimposed result; and a status display unit which displays a change in status of a virtual object, wherein the status display unit groups the fantasy blocks for each prescribed attribute, and displays, for each group, the proportion of the number of blocks for which the statuses have changed, in each group.

7 Claims, 12 Drawing Sheets

(51) Int. Cl.
    *A63F 13/5372* (2014.01)
    *A63F 13/69* (2014.01)
    *G06T 11/60* (2006.01)
    *G09B 29/10* (2006.01)

(52) U.S. Cl.
    CPC .............. *A63F 13/69* (2014.09); *G06T 11/60* (2013.01); *G09B 29/106* (2013.01); *A63F 2300/205* (2013.01); *A63F 2300/306* (2013.01); *A63F 2300/609* (2013.01); *A63F 2300/69* (2013.01); *G06T 2200/24* (2013.01)

(56) References Cited

FOREIGN PATENT DOCUMENTS

| | | | |
|---|---|---|---|
| CN | 102958573 | A | 3/2013 |
| JP | 2016209110 | A | 12/2016 |
| JP | 6075489 | B1 | 2/2017 |
| JP | 2017055995 | A | 3/2017 |
| WO | 2017090272 | A1 | 6/2017 |
| WO | 2017090274 | A1 | 6/2017 |

OTHER PUBLICATIONS

Ingress are decided how on Jan. 26, 2017 ?, and [online]—May 27, 2015, [Nov. 29, 2017 search], URL, http://ingress-bunkyo.tokyo/1192.

JP2017-210584 Allowed Amended Claims, dated May 22, 2018, 3 pgs.

JP2017-210584 Decision to Grant a Patent, dated Jul. 3, 2018, 2 pgs.

JP2017-210584 Notice of Reasons for Refusal, dated May 15, 2018, 3 pgs.

PCT/JP2018/040522 International Search Report dated Dec. 18, 2018, 2 pgs.

[FIG. 1]
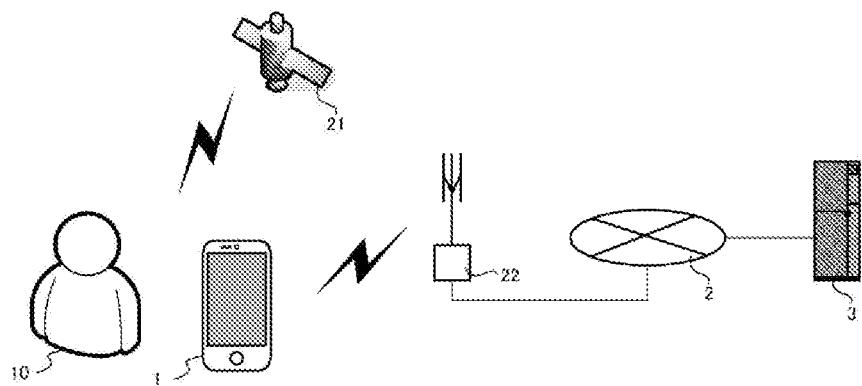
[FIG. 2]
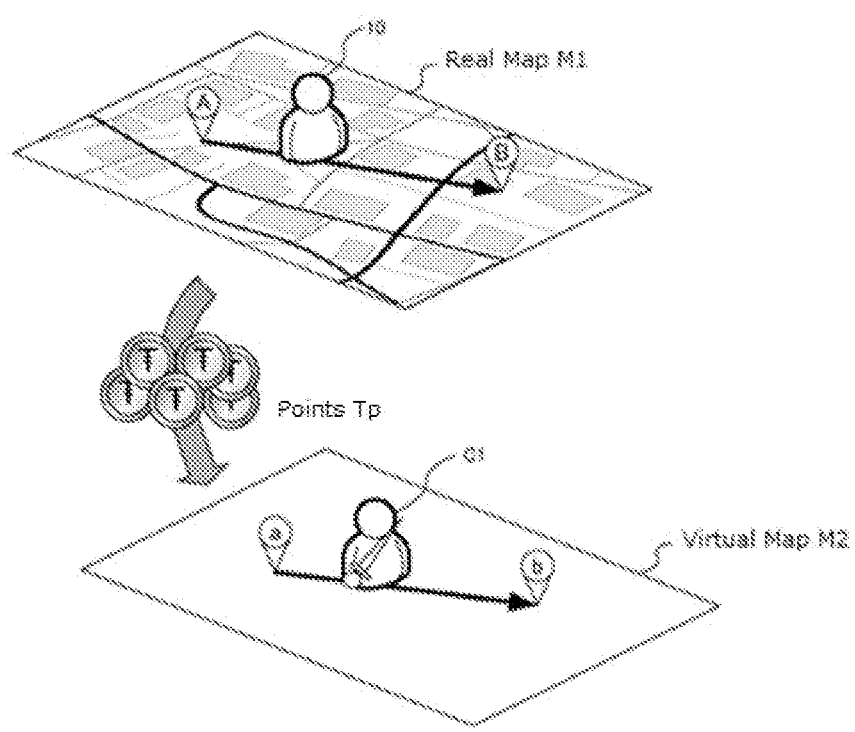

[FIG. 3]
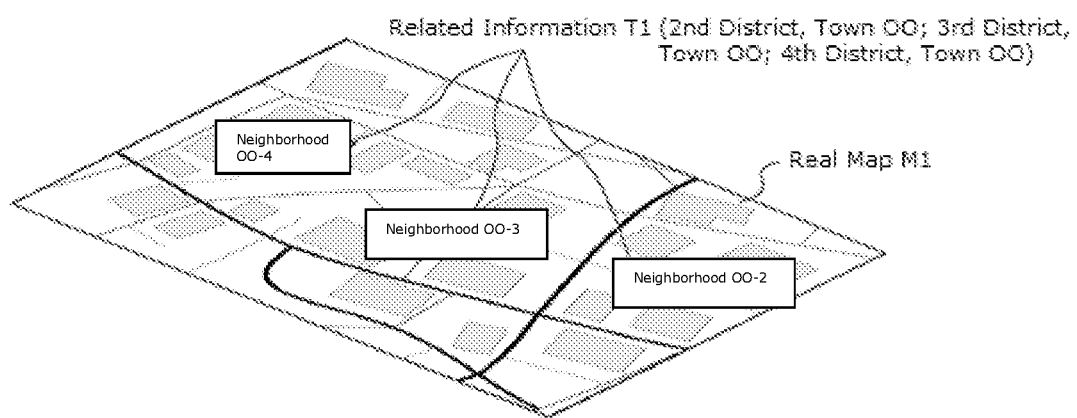
[FIG. 4]
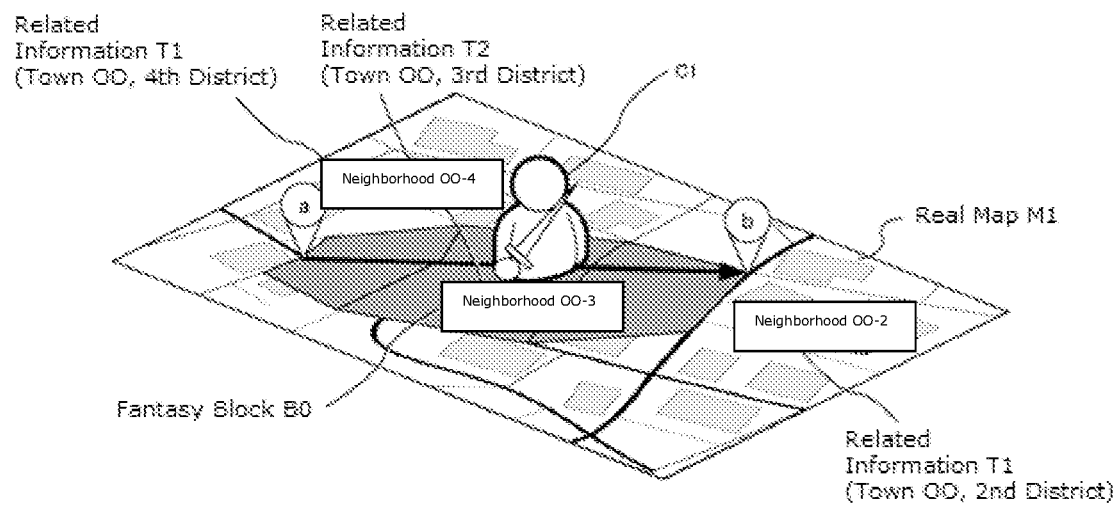

[FIG. 5]
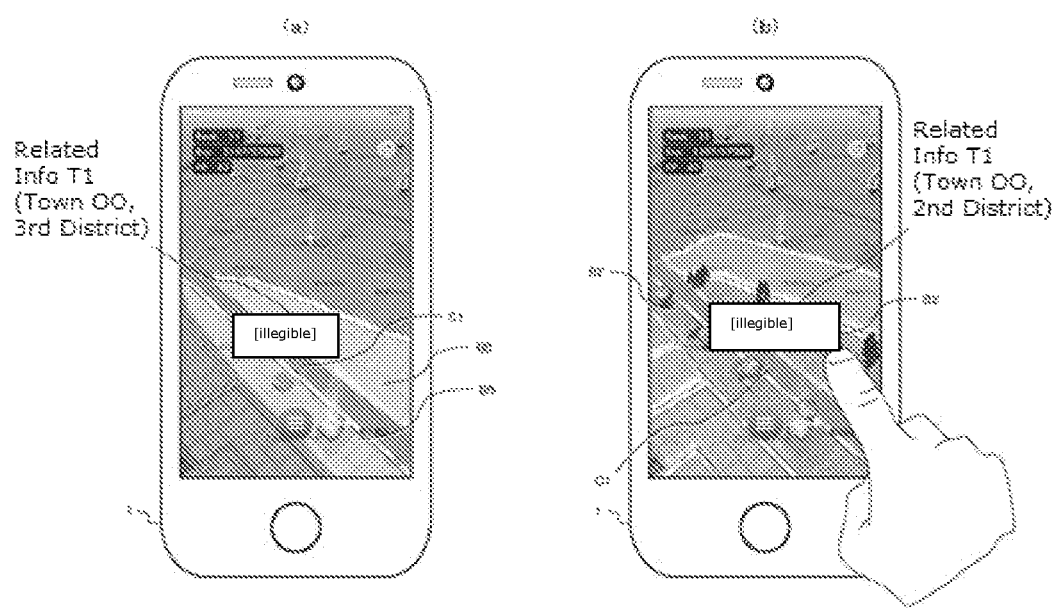

[FIG. 6]
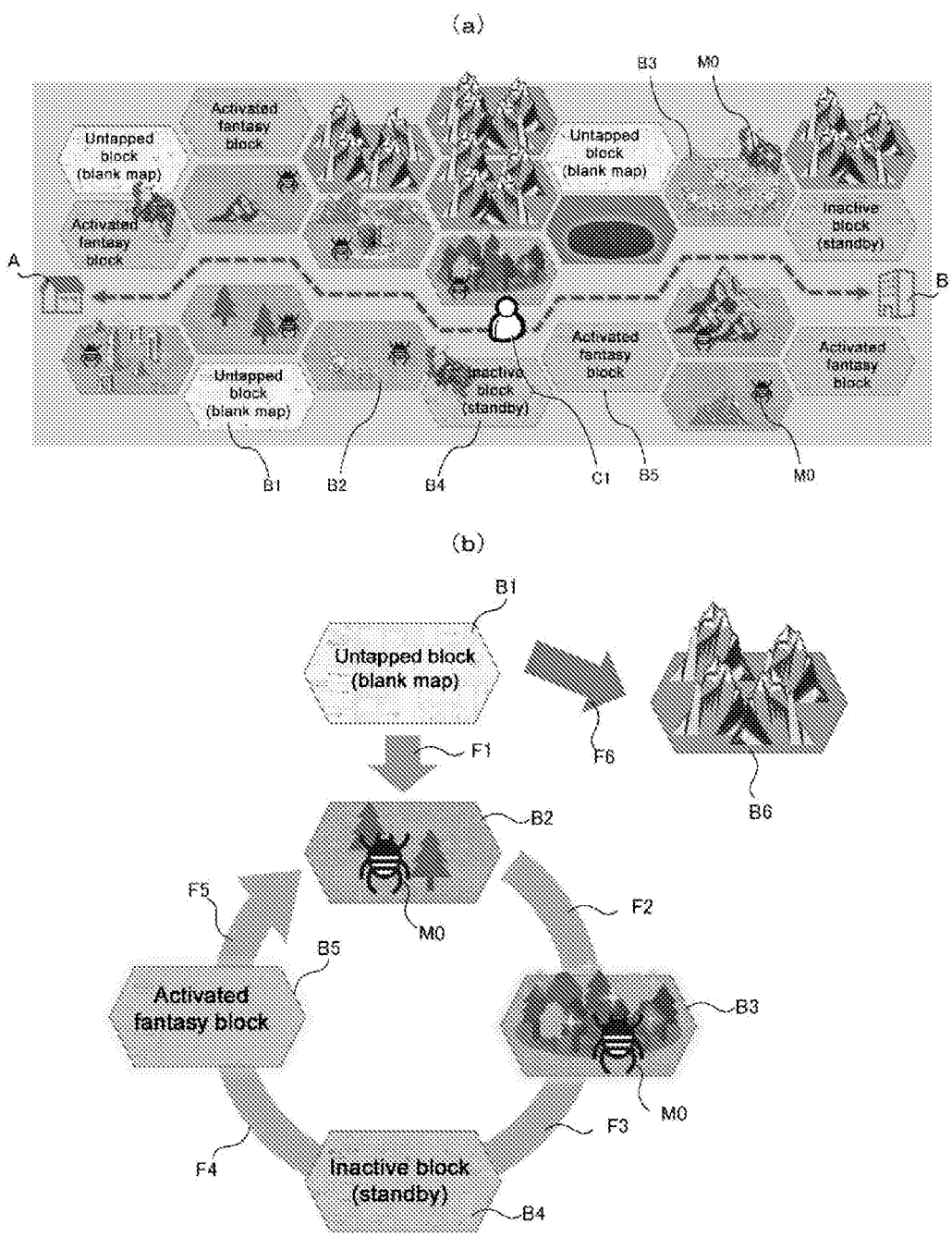

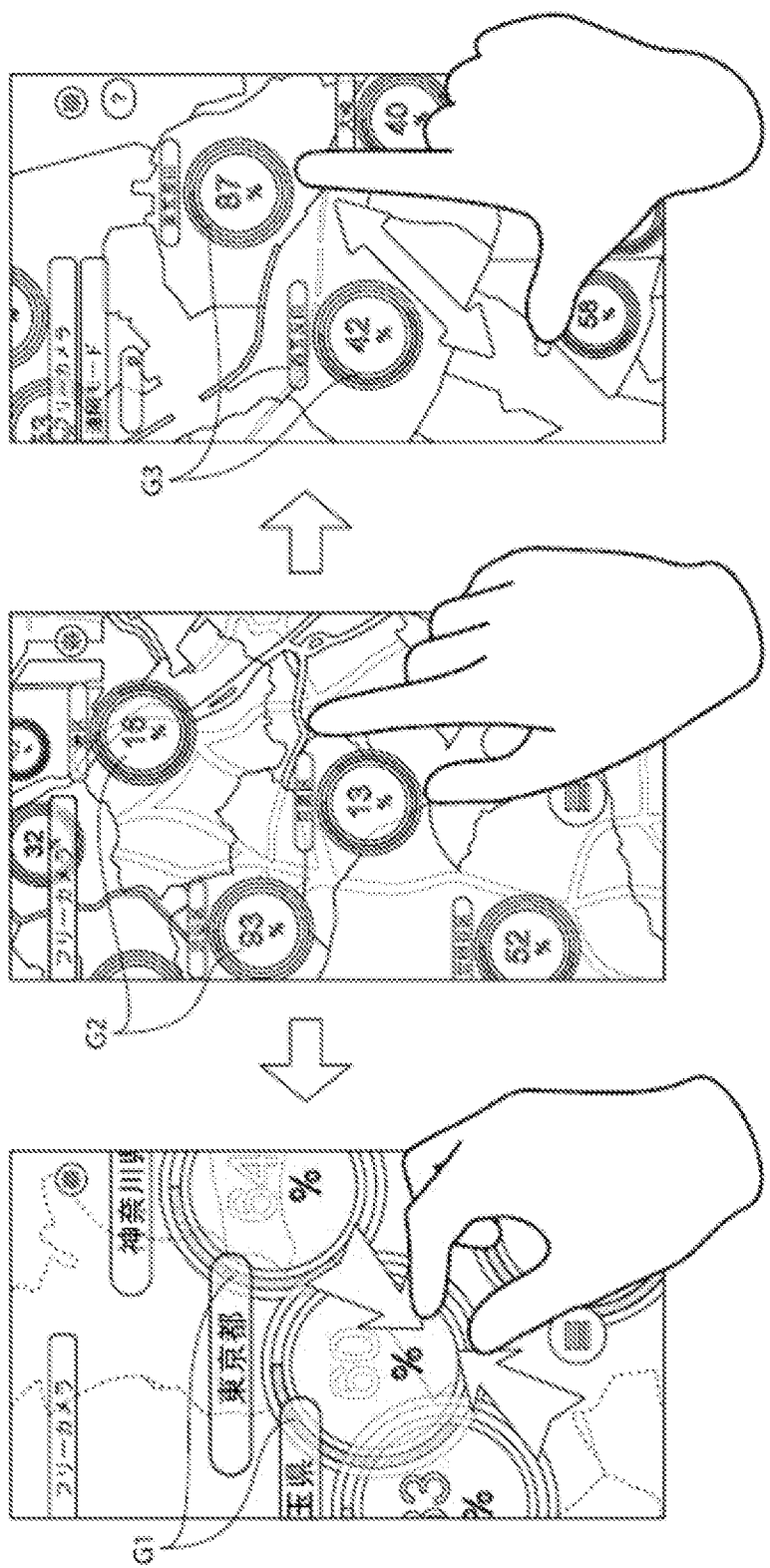

[FIG. 8]
(a)
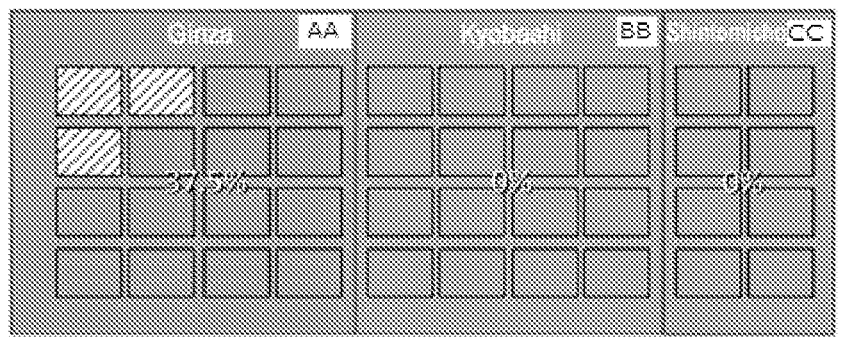
(b)
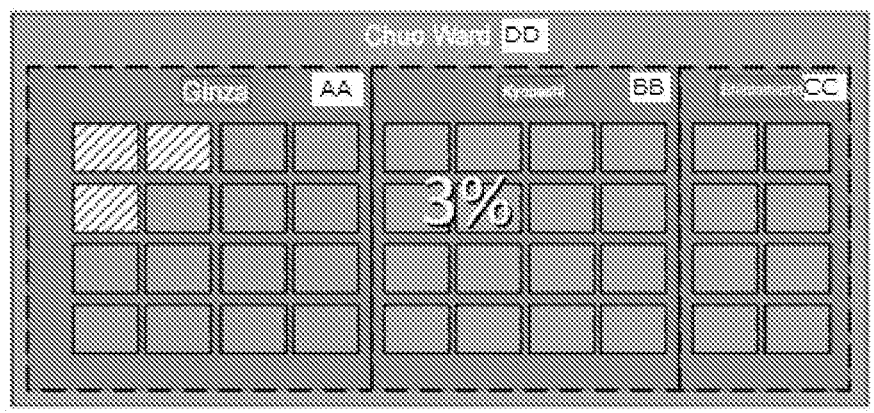
(c)
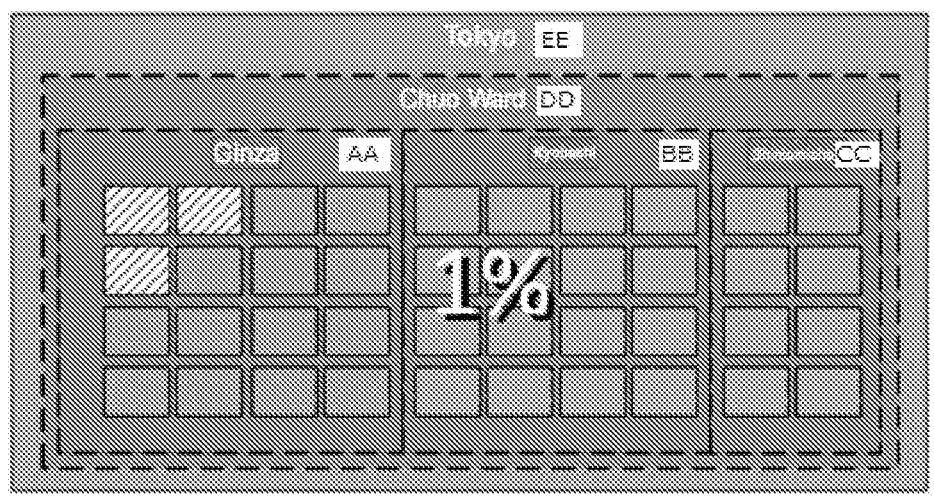

[FIG. 9]
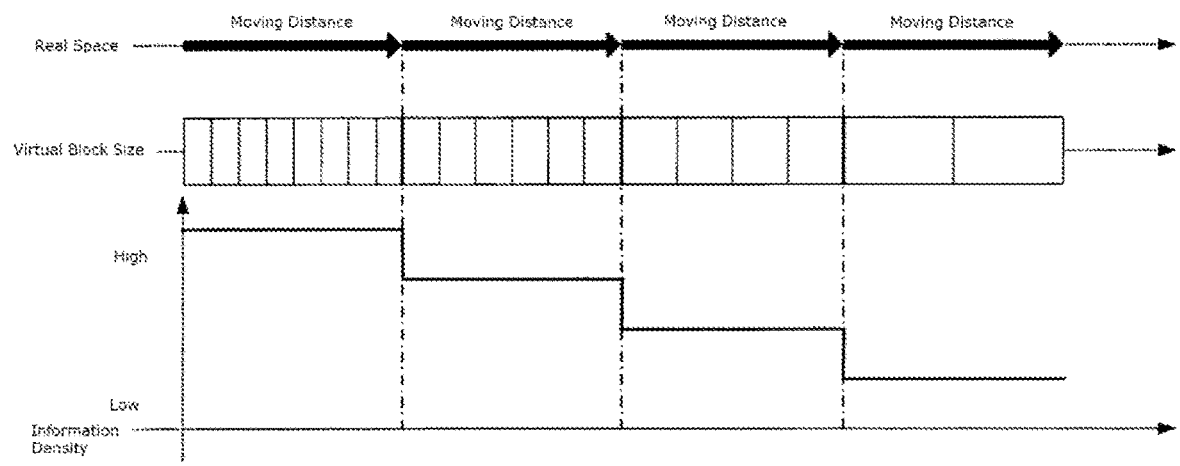
[FIG. 10]
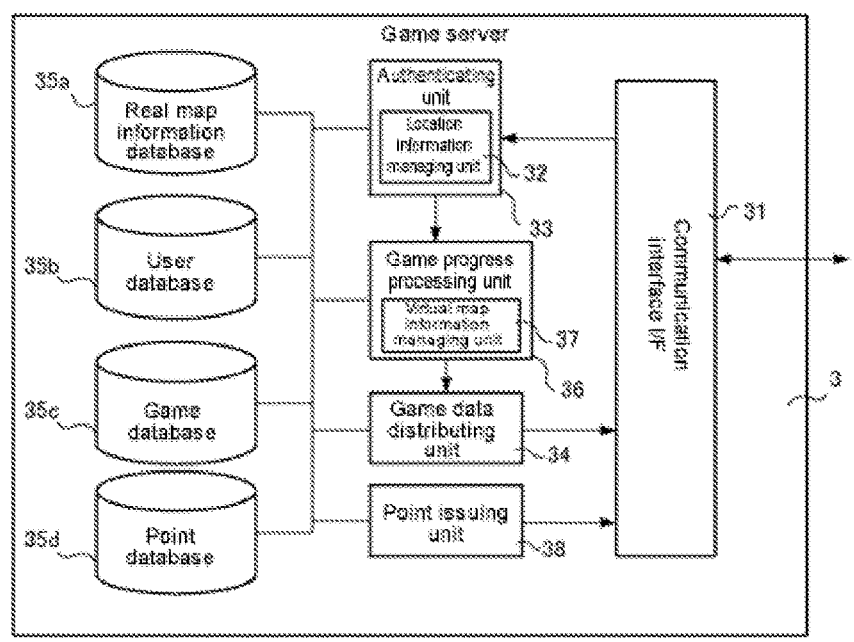

[FIG. 11]
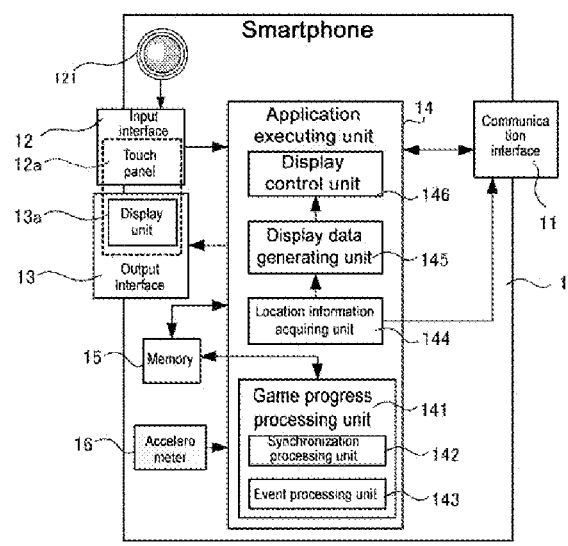
[FIG. 12]
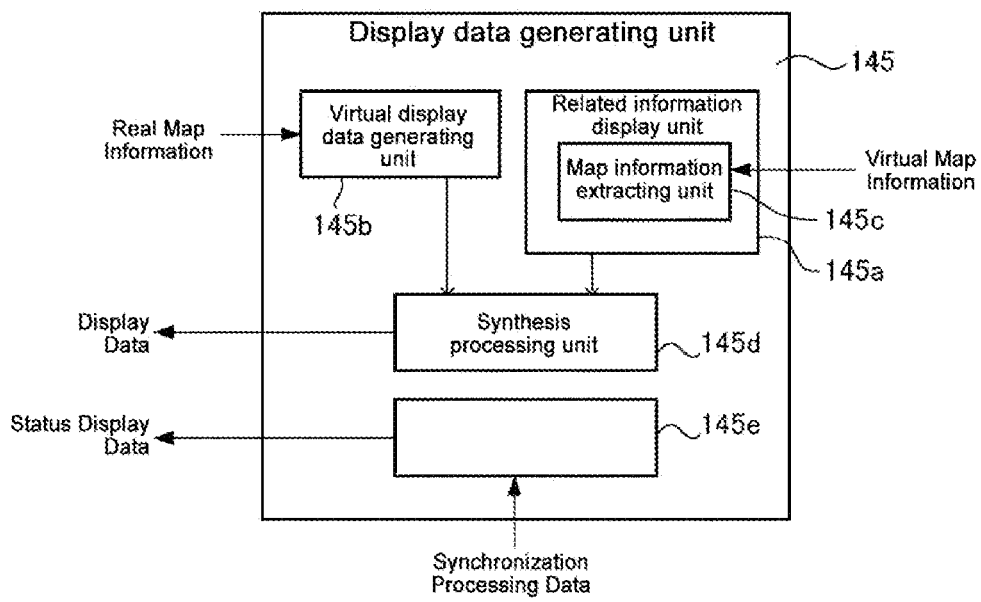

[FIG. 13]
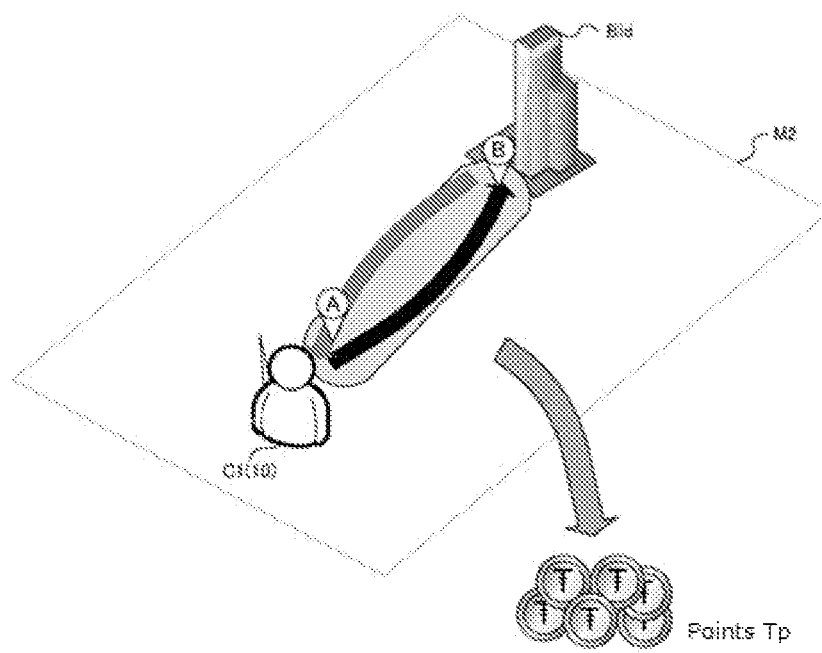

[FIG. 14]
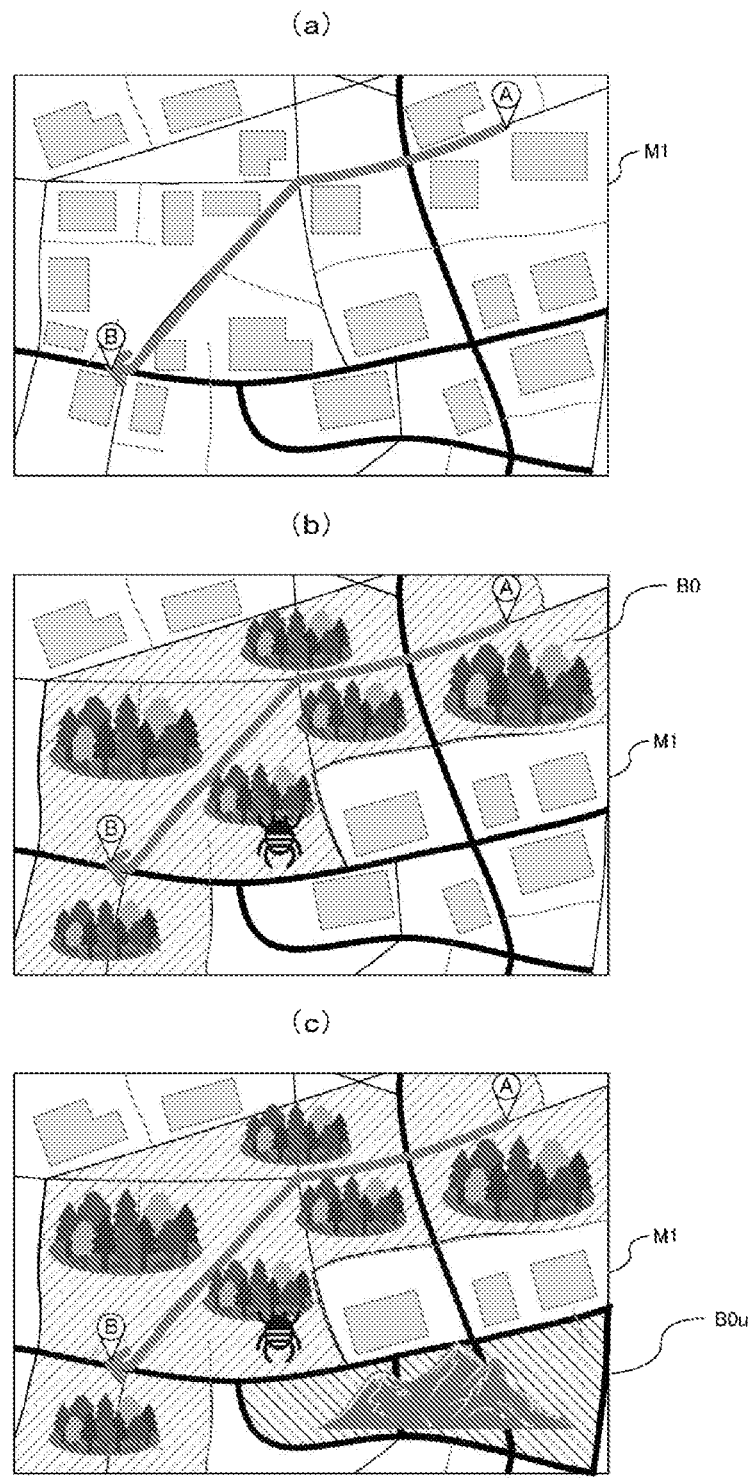

[FIG. 15]
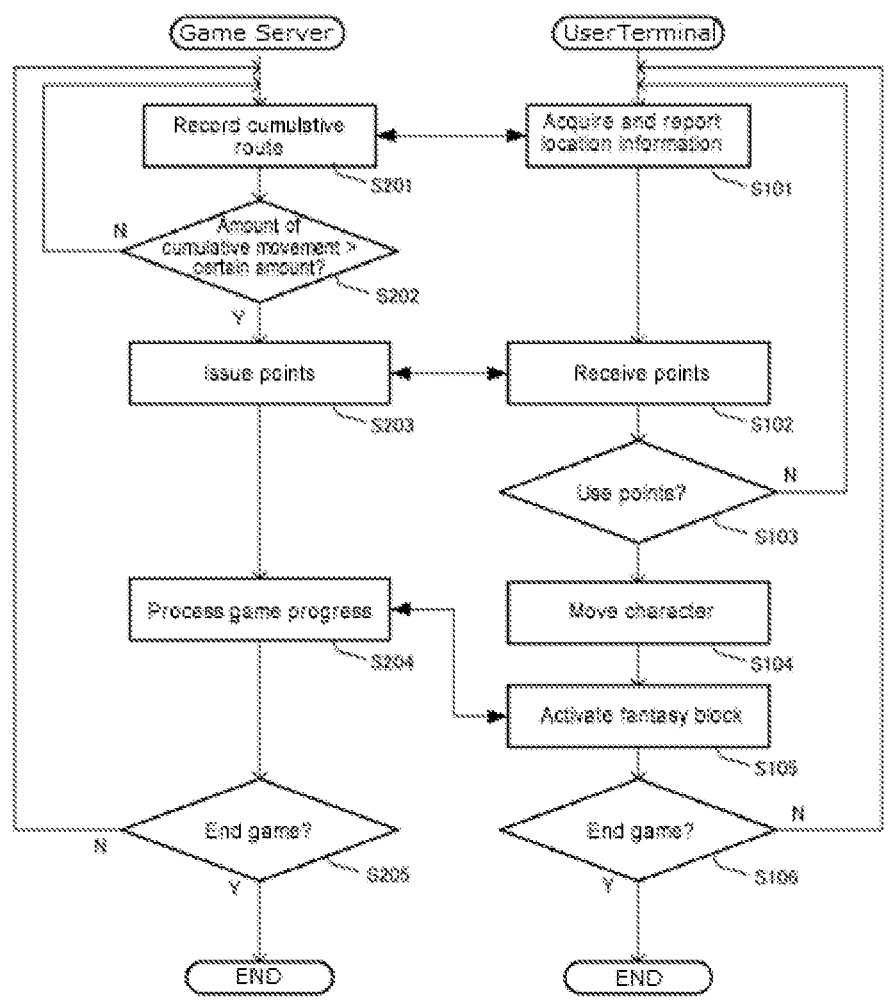

[FIG. 16]
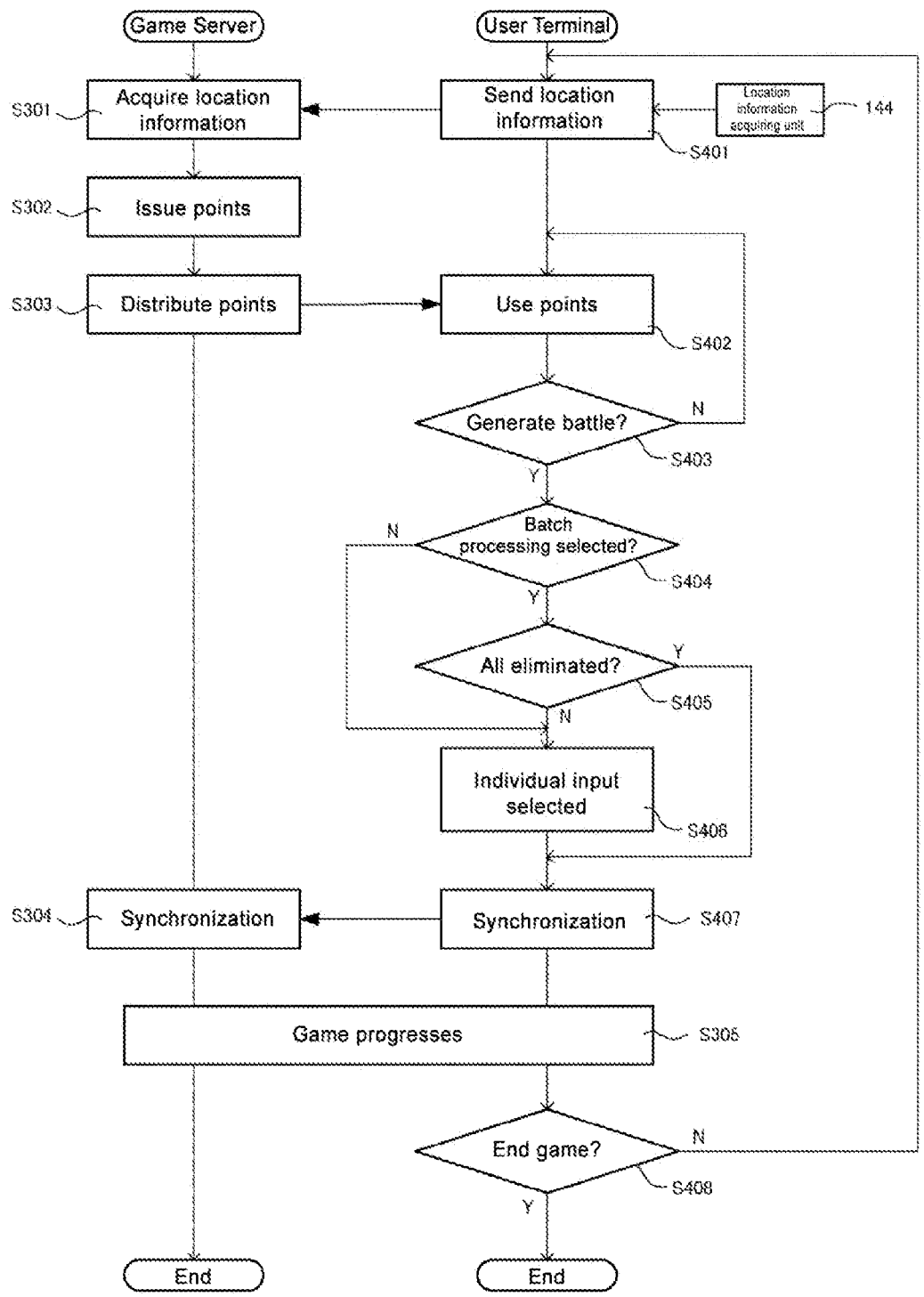

INTERFACE SYSTEM, PROGRAM AND CONTROL METHOD FOR LOCATION GAME

TECHNICAL FIELD

The present invention relates to an interface system, program and control method for a location-based game in which a game progresses in a virtual world based on movement by the user through the real world.

BACKGROUND ART

Portable information processing devices that exchange information wirelessly, such as smartphones, mobile phones and mobile PCs, have become increasingly multifunctional. For example, location information services such as GPS can now be used on these devices. Several location-based games that combine the portability of these information processing devices with the use of location information services have been proposed (see, for example, Patent Document 1). In location-based games using location information services, points are acquired, for example, by moving target distances and reaching bases and checkpoints.

CITATION LIST

Patent Literature

Patent Document 1: JP 2001-70658 A

SUMMARY OF INVENTION

Technical Problem

In location-based games using location information services, users acquire points, for example, by moving target distances and reaching bases and checkpoints. This creates a sense of achievement and provides motivation.

However, enjoyment of the game eventually diminishes when users achieve their goal simply by reaching destinations. A sense of achievement is not obtained and motivation is not maintained when target distances are too long and there are too many bases and checkpoints. As a result, users will get bored unless there are more changes in the game.

It is an object of the present invention to solve this problem by providing an interface system, program, and control method for a location-based game, in which the game progresses in a virtual world based on movement of the user through the real world, to enhance enjoyment of the game, create a sense of achievement, and provide motivation.

Solution to Problem

In order to solve this problem, the present invention provides an interface system for a location-based game in which a game progresses in a virtual world based on movement by the user through the real world, the interface system comprising:

a virtual display data generating unit for generating virtually rendered objects (virtual objects) as the game progresses with movement by the user;

a synthesis processing unit for superimposing and displaying generated virtual objects on real map information; and a status display unit for displaying changes in the status of virtual objects; wherein the virtual objects are displayed according to geographic information in the real world and the status of the virtual objects is changed as the game progresses, and the status display unit defines an area by a set of virtual objects displayed on the screen to display the area proportion occupied by virtual objects whose status has changed.

The present invention is also an interface control method for a location-based game in which a game progresses in a virtual world based on movement by the user through the real world, the interface control method comprising the steps of:

causing a virtual display data generating unit to generate virtual objects as the game progresses with movement by the user;

causing a synthesis processing unit to superimpose and display generated virtual objects on real map information; and causing a status display unit to display changes in the status of virtual objects;

wherein the virtual objects are blocks having a flat shape corresponding to geographic information in the real world and cover some or all of the real map information in municipal district units, and the status display unit groups virtual objects by predetermined attributes and displays the proportion of virtual objects whose status has changed in each group quantitatively by grouping.

The system and control method of the present invention can be realized by executing a program of the present invention written in a certain language on a computer. In other words, an interface program for a location-based game in the present invention can be installed on an IC chip or in a memory unit for a portable information processing terminal, such as a smartphone, wearable terminal or mobile PC, or a general-purpose computer such as a personal computer or server computer, and executed by a CPU to construct a system with the functions described above and realize the method of the present invention.

An interface program for a location-based game in the present invention can be distributed via communication lines, recorded and distributed on a computer-readable storage medium, or acquired as a package application run on a standalone computing device. The storage medium can be a magnetic recording medium such as a floppy disk or cassette tape, an optical disc such as a CD-ROM or DVD-ROM disc, or some other storage medium such as a RAM card. The computer-readable storage medium used to record the program can be run on a general-purpose computer or dedicated computer to realize the system or method described above, and can be used to easily store, transport, and install the program.

The present invention also provides an interface program for a location-based game in which a game progresses in a virtual world based on movement by the user through the real world, the interface program causing a computer to function as a virtual display data generating unit for generating virtual objects as the game progresses with movement by the user;

a synthesis processing unit for superimposing and displaying generated virtual objects on real map information; and a status display unit for displaying changes in the status of virtual objects;

wherein the virtual objects are blocks having a flat shape corresponding to geographic information in the real world and cover some or all of the real map information in municipal district units, and the status display unit groups virtual objects by predetermined attributes and displays the area proportion occupied by each group of virtual objects whose status has changed quantitatively by grouping.

Preferably, in the present invention, the virtual objects are blocks having a flat shape corresponding to geographic information in the real world and cover some or all of the real map information in municipal district units, the blocks appear in an inactive state on the real map information along a route traveled by a user in the real world and transition to an active state based on a user selection operation, and the status display unit displays the inactive status or active status as a change in state.

Effects of the Invention

In a location-based game in which a game progresses in a virtual world based on movement by the user through the real world, the present invention groups activated objects in ranges of a predetermined breadth and switches the breadth of the grouping in stages to successively display the proportion of virtual blocks occupied in each stage. This increases enjoyment of the game, creates a sense of achievement, and provides motivation.

BRIEF DESCRIPTION OF DRAWINGS

FIG. 1 is a schematic diagram showing the overall configuration of a game system in an embodiment of the present invention.

FIG. 2 is an explanatory diagram showing the relationship between real map information M1 and virtual map information M2 in the present embodiment.

FIG. 3 is an explanatory diagram showing geographic information and text information displayed on the real map information M1 in the present embodiment.

FIG. 4 is an explanatory diagram showing text information displayed in fantasy blocks on the real map information M1 in the present embodiment.

FIG. 5 is an explanatory diagram showing the operation of fantasy processing in the present embodiment.

FIG. 6(a) is an explanatory diagram showing the relationship between movement of the character and fantasy processing in the present embodiment, and FIG. 6(b) is an explanatory diagram showing fantasy processing and state transitions in the present embodiment.

FIG. 7 is an explanatory diagram showing the grouping operation for fantasy blocks in the fantasy processing of the present embodiment.

FIG. 8 is an explanatory diagram showing the grouping of fantasy blocks in the fantasy processing of the present embodiment.

FIG. 9 is an explanatory diagram showing the relationship between the size of fantasy blocks and information density in the fantasy processing performed in the present embodiment.

FIG. 10 is a block diagram showing the internal configuration of a game server 3 in the present embodiment.

FIG. 11 is a block diagram showing the internal configuration of a smartphone 1 in the present embodiment.

FIG. 12 is a block diagram showing the internal configuration of a display data generating unit in the present embodiment.

FIG. 13 is a diagram used to explain the accumulation of points based on repeated back and forth movement in the present embodiment.

FIG. 14 is an explanatory diagram showing superimposed graphics on municipal districts in the fantasy processing performed in the present embodiment.

FIG. 15 is a flowchart showing the steps in the point issuing process performed in the present embodiment.

FIG. 16 is a sequence diagram showing the batch processing operations performed in the present embodiment.

DESCRIPTION OF EMBODIMENTS

The following is a detailed description of the game system and game program in an embodiment of the present invention with reference to the appended drawings.

(Overall System Configuration)

FIG. 1 is a schematic diagram showing the overall configuration of a game system in an embodiment of the present invention. The game system in the present embodiment, as shown in FIG. 1, includes an interface system for the location-based game in the present invention and is essentially composed of a smartphone 1 or some other portable terminal device employed by the user 10, and a game server 3 installed on the internet 2. In the present embodiment, the portable terminal device is a smartphone 1.

In the present embodiment, the game server 3 is a server used to process progress in the game. This can be a single server device or a group of server devices used to virtually create function modules in a CPU and perform processing linked to these function modules. The game server 3 can exchange data over the internet 2 using a communication function and display webpages via browser software using a web server function.

The smartphone 1 is a portable information processing terminal using wireless communication. It is a mobile phone communicating wirelessly via wireless base stations 22 serving as relay points and receives communication services such as phone and data services as it moves. Communication systems used by mobile phones include the 3rd Generation (3G) system, Long-Term Evolution (LTE) system, the 4G system, the FDMA system, the TDMA system, the CDMA system, the W-CDMA system, and the Personal Handyphone System (PHS). This smartphone 1 is equipped with various functions such as digital camera functions, application software executing functions, a location information acquiring function using, for example, the Global Positioning System (GPS), and mobile computer functions such as tablet PC functions.

The location information acquiring function acquires and records location information indicating the location of the device itself. The location information acquiring function, as shown in FIG. 1, includes a position detecting method using signals from satellites 21, such as GPS, or a position detecting method using the intensity of wireless signals from wireless base stations 22 for mobile phones or from Wi-Fi communication access points.

The smartphone 1 is also equipped with a liquid crystal display serving as a display unit for displaying information, and a control device such as control buttons for user input operations. The control device can also be a touch panel superimposed over the liquid crystal display to serve as an input unit for acquiring control signals based on touch operations at certain coordinate positions on the liquid crystal display. More specifically, the touch panel is an input device that senses a touch operation from a finger or pen using pressure or electrostatic detection and inputs control signals. Touch sensors superimposed on a liquid crystal display that is displaying graphics receive control signals based on the coordinate position of graphics displayed on the liquid crystal display.

(Internal Configuration of Each Device)

The following is an explanation of the internal configuration of each device constituting this game system. FIG. 10 is a block diagram showing the internal configuration of a game server 3 in the present embodiment, and FIG. 11 is a block diagram showing the internal configuration of a smartphone 1 in the present embodiment. In the following explanation, a "module" can be hardware such as a device, software performing a function, or a combination of both. A module indicates a function unit used to perform a certain operation.

(1) Game Server

First, the internal configuration of the game server 3 will be explained. The game server 3 is a server device on the internet 2 that exchanges data with each smartphone 1 via the internet 2. The game server 3 comprises a communication interface 31 for exchanging data via the internet 2, an authenticating unit 33 for authenticating users or user devices, a location information managing unit 32 for collecting and managing location information on each user terminal, a game progress processing unit 36 for executing game progress processing for the entire game and for each user in the game, a virtual map information managing unit 37 for generating virtual map information, a game data distributing unit 34 for distributing game data to each user, and various databases.

The game databases include a real map information database 35*a* serving as a real map information storage unit for storing real map information including geographic information on the real world, a user database 35*b* for collecting information on users, a game database 35*c* for collecting information related to game progress processing for the entire game and for individual users, and a point database 35*d* for managing the issuing of points. Each of these databases can be a single database or a relational database in which the data is divided among multiple databases that are linked to each other by establishing relationships between them.

The real map information database 35*a* is a storage device for storing real map information including geographic information in the real world. This geographic information includes natural geographic elements such as mountains, valleys and rivers, and man-made structures such as buildings, roads and railways, in addition to place names, addresses, and traffic restrictions. The real map information also includes text information related to the geographic information such as the names of places, administrative districts, highways, rivers and mountains. The real map information database 35*a* may be a map information database used by other map service providers or one owned and operated by the service provider operating the game server 3.

Information stored in the user database 35*b* includes identifiers used to identify users or terminal devices operated by users (user IDs, terminal IDs) and authentication information linked to passwords. It also includes personal information on users linked to user IDs and the types of terminal devices being used. The user database 35*b* also contains the authentication history (access history) of each user or user terminal, information related to game progress made by each user in relation to the game database 35*c* (current location in terms of longitude and latitude, game status, score, usage history, etc.), and payment information related to the game.

Information stored in the game database 35*c* includes game data such as map information for the virtual world, character and object properties, information related to event processing, and graphics information, as well as mapping data linking game data to the geographic elements in real map information such as buildings, roads and railways. The point database 35*d* manages issued points linked to users, user terminals or applications, and stores the usage history at each point.

The authenticating unit 33 is a module that establishes a communication session with each smartphone 1 via the communication interface 31 and performs the authentication processing for each communication session. In the authentication processing, authentication information is acquired from the smartphone 1 of the user seeking access, the user database 35*b* is accessed to identify the user, and authenticates user privileges. The results of the authentication performed by the authenticating unit 33 (user ID, authentication time, session ID, etc.) are sent to the game progress processing unit 36 and stored in the user database 35*b* as part of the authentication history.

The location information managing unit 32 is a module that receives location information from the user terminal device and sends the location information to the game server 3. The location information managing unit 32 links the identifier (user ID, terminal ID, etc.) for the user or user terminal device identified by the authenticating unit 33 in the authentication process with this location information and stores the linked information in the user database 35*b* as user history. The location information acquired at this time may include coordinates at the time video was captured by an imaging unit (latitude/longitude/altitude captured in real map information and virtual map information), and time and date information at the time.

The game progress processing unit 36 is a module that moves characters for each user, monsters, and other objects in a virtual world, performs various types of event processing, and causes the game to progress. It runs a game program that includes certain rules, logic and algorithms, and performs event processing such as battles, mini-games, video playback, and the fantasy conversion (activation) of municipal districts based on the positional relationship between characters and objects (approaching, confronting, etc.). In particular, the game progress processing unit 36 executes event processing based on the current location of each user according to location information on each user acquired from the location information managing unit 32, based on the number of points in the possession of each user, and based on the effects of a character C1 moving through a virtual world or being moved through the virtual world. This is performed to generate the effect of a character C1 actually walking around and acquiring items on a fantasy map.

In the present embodiment, the game progress processing unit 36 works with a game progress processing unit 141 in a smartphone 1 so that some of the game progress processing is executed by the game server 3 and some of the graphics processing and event processing is executed by the game progress processing unit 141 in the smartphone 1. For example, the game server 3 predicts event processing that can occur based on the location of another user's character or the location of an object. The game server 3 generates conditions for event occurrence and sends the conditions to the smartphone 1. The actual event processing and graphics processing are then executed by the smartphone 1 based on conditions received from the game server 3.

The virtual map information managing unit 37 is a module that manages and controls the generating, storage and distribution of virtual map information M2, including object coordinate information on other users' characters and objects such as buildings in virtual geographical information, corresponding to geographical information in the real map information M1 as shown in FIG. 2, as game progress is processed by the game progress processing unit 36. In the present embodiment, points Tp are issued based on the actual distance traveled by the user 10 based on real map information M1, and these points Tp can be used to move the character C1 corresponding to the user 10 through the virtual map information M2 and generate fantasy blocks B0 along the route traveled. In the fantasy display, as shown in FIG. 5(a) and FIG. 5(b), the user touches a block B0 formed in the shape of a municipal district adjacent to the route on the screen, and the block B0 is turned into a fantasy block. Each type of block B2-B5 on the virtual map is superimposed over a municipal district in real map information M1.

Points Tp are given to users based on the frequency or interval of game server access, and purchases can be made by the user with money or points or a server can bill the user. Points Tp can be given when certain events have been completed in the game, when a certain score has been achieved in a mini-game, or when a character has leveled up or cleared a level.

Virtual map information M2 is generated by the game server 3, by a smartphone 1, or by the game server 3 and the smartphone 1 working together. The virtual map information managing unit 37 manages virtual map information M2 generated and stored by the game server 3 as well as information related to virtual map information M2 generated and stored by a smartphone 1, compares the virtual map information M2 from both of them, and distributes some or all of the virtual map information M2 to the smartphone 1 as necessary to synchronize the two.

When virtual map information M2 is generated by the game server 3, the virtual map information managing unit 37 acquires the geographic elements, buildings, roads, and rail lines in real map information M1 stored in the real map information database 35a, references mapping data stored in the game database 35c, and divides map information in the virtual world into block B0 units based on map information for the virtual world corresponding to real map information M1, the characteristics (attributes) of characters and objects, and information related to event processing, and graphic information.

The game data distributing unit 34 is a module that distributes map information and graphics for the virtual world to each user via the communication interface 31 based on the current location of each user and the controls performed by the virtual map information managing unit 37 to synchronize the virtual map information M2 generated by the virtual map information managing unit 37. The graphics for the virtual world are divided into municipal district blocks corresponding to real map information M1 and distributed in block units.

In the present embodiment, the area and shape of these divided fantasy blocks is automatically changed based on how fast the user is moving through the virtual world, how fast the user is moving through the real world, and on the density of information in real map information or virtual map information. As shown in FIG. 9, boundary lines in real map information are selected to form areas and shapes corresponding to the current location of the user in the real world and the density of information in the real map information M1 corresponding to the current location of the user, and fantasy blocks with a closed linear shape are generated. For example, roads, rivers, topographical lines, administrative district lines for cities, towns and villages, district lines and other lines in the area adjacent to existing fantasy blocks are selected in order to determine the area and shape based on the density of information, and connecting intersection points are selected to define a closed linear shape connected to existing virtual blocks, and a fantasy block is generated. In this way, the area of division units can be reduced in areas with a high information density per unit area such as urban areas with lots of buildings and stores, and the area of division units can be increased in areas with a low information density per unit area such as suburban and exurban areas.

(2) Smartphone 1

The following is a description of the internal configuration of a smartphone 1. As shown in FIG. 11, a smartphone 1 has a communication interface 11, an input interface 12 and output interface 13, an application executing unit 14, and a memory 15 constituting the user interface module with the game system.

The communication interface 11 is the communication interface used to exchange data, and includes functions for non-contact communication such as those for wireless communication and functions for contact (wired) communication using, for example, a cable and adapter. The input interface 12 is a mouse, keyboard, control buttons and/or a touch panel 12a employed by the user to input information. The output interface 13 is a device such as a display and speaker for outputting video and audio. The output interface 13 includes a display unit 13a such as a liquid crystal display and a touch panel 12a serving as an input interface superimposed on the display unit.

The memory 15 is a storage device used to store the operating system (OS), firmware, programs for various applications, and other data. The memory 15 is also used to store the user ID for identifying the user, game application data downloaded from the game server 3, and game data processed by the application executing unit 14. In the present embodiment, virtual map information M2 and real map information M1 obtained from the game server 3 are also stored in the memory 15. The virtual map information M2 is stored in block units divided into shapes corresponding to municipal districts in the real map information M1.

The application executing unit 14 is a module for executing the OS, game application, and other applications such as browser software. This is usually executed by the CPU. In order to execute the location-based game program of the present invention including an interface program for the location-based game, the application executing unit 14 constructs the game progress processing unit 141, synchronization processing unit 142, event processing unit 143, location information acquiring unit 144, display data generating unit 145, and display control unit 146 virtually.

The game progress processing unit 141 is a module that moves characters for each user, monsters, and other objects in a virtual world, performs various types of event processing, and causes the game to progress following the same rules, logic and algorithms as the game program executed by the game server 3. It also synchronizes with the game progress processing unit 36 in the game server 3 via the synchronization processing unit 142 to perform event processing such as battles, mini-games, video playback, and the fantasy conversion of municipal districts based on the positional relationship between characters and objects (approaching, confronting, etc.).

The game progress processing unit 141 in the present embodiment works with the game progress processing unit 141 in the game server 3 so that some of the game progress processing is executed by the game server 3 and some of the graphics processing and event processing is executed by the game progress processing unit 141 in the smartphone 1. For example, the game server 3 generates conditions for an event to occur and sends these conditions to the smartphone 1, and the event is actually generated and the graphics processing for this event executed by the smartphone 1.

The synchronization processing unit 142 is a module that synchronizes game progress processing and image analysis processing performed by the smartphone 1 with game progress processing and image analysis processing performed by the game server 3. More specifically, the game server 3 predicts event processing that can occur based on the location of another user's character or the location of an object. The game server 3 generates conditions for event occurrence and sends the conditions to the smartphone 1. The conditions are received by the synchronization processing unit 142, and the actual event processing and graphics processing are then executed by the game progress processing unit 141 in the smartphone 1 based on conditions received from the game server 3. The results of event processing executed by the game progress processing unit 141 in the smartphone 1 (victory in a battle, score in a mini-game, fantasy districts, etc.) are sent to the game progress processing unit 141 in the game server 3 via the synchronization processing unit 142, and the results are reflected in subsequent game progress processing.

The event processing unit 143 is the module for event processing generated by the game progress processing unit 141. The location information acquiring unit 144 monitors the traveling speed at the current location of the device itself acquired by the location information acquiring unit 144 and grants permission for batch processing in an event when the traveling speed at the current location is at or above a predetermined value and event processing generated by the game progress processing unit 141 is for an event allowing for predetermined batch processing. The game progress processing unit 141 can also allow for batch operation termination in place of multiple routine operations in an event allowing for batch operations so that the operation can be eliminated to allow the game to progress. The synchronization processing unit 142 notifies the game progress processing unit 141 in the game server 3 of event processing performed by the event processing unit 143 with an operation omitted, and reports to the game server 3 that the game has progressed with an operation omitted from event processing that satisfies event processing requirements.

The location information acquiring unit 144 is a module that selects and acquires coordinate positions in the real world. The current location of the user and the current locations of other users are acquired using satellites in the global positioning system (GPS), base station positioning using triangulation based on the radio field intensity and information from base stations, and Wi-Fi positioning using the Wi-Fi SSID (Service Set ID) and a database combining radio wave conditions with longitude and latitude.

The location information acquiring unit 144 can also select any coordinate position based on an event generated by a user operation or game progress to acquire location information or measure the traveling speed. The location information acquiring unit 144 also has a function for acquiring the coordinate position of any object and references the databases 35*a-c* to acquire the current coordinate position, the coordinate position on a virtual map, or the change in orientation history.

In particular, the databases 35*a-c* can be searched to acquire the location of any object or any object acting as a proxy object for the user at any location in real map information or virtual map information. Because a location of any proxy object can be moved automatically in map information by game progress processing unit 36 or 141, the proxy object can be linked to the current location of a user or moved automatically as the game progresses.

When measuring the traveling speed using the location information acquiring unit 144, sudden movement can be detected from detection signals from an accelerometer 16, and it can be determined that the user is moving when the acceleration exceeds a predetermined value. When measuring the traveling speed, it can also be determined that the user is moving based on a change in GPS values when the user enters a vehicle and begins to travel at high speed. In relation to high-speed movement, when GPS signals cannot be received in the subway or inside a station, it monitors for updated location information based on the switching of 3G/4G base stations and from changes in Wi-Fi radio wave reception. When location information changes more quickly than a normal walking pace, it can be determined that the user is moving. When determining movement based on the switching of base stations, the change in location information is not continuous, so the distance moved by the user and the traveling speed are estimated within a predetermined range based on the distance between base stations and changes in radio wave reception so that it moves at predetermined intervals (such as five minute intervals) once movement has been detected.

The location information acquiring unit 144 in the present embodiment is equipped with a travel route recording unit 144*a*. This travel route recording unit 144*a* is a module that calculates and stores the travel route and traveling speed based on the current location of the user acquired by the location information acquiring unit 144, the current location of other users, the coordinate position of any object, and change in orientation information for each user or object. The travel route recording unit 144*a* can determine the travel route by, for example, connecting each adjacent pair of positions sampled in chronological order via the shortest distance, or determining the route between pairs of points with reference to geographic information.

The display data generating unit 145 is a module that generates the display data to be displayed on the display unit 13*a*. The display data is generated by combining graphics data, image data, text data, video data, audio data, and other types of data. In the present embodiment, the display data generating unit 145 functions as a real map display data generating unit for generating real map display data at the current location of a user in real map information M1 based on the current location of the user acquired by the location information acquiring unit 144, and a virtual map display data generating unit for generating virtual map display data for a character at the current location of the user in virtual map information M2 based on the current location of the user acquired by the location information acquiring unit 144. The display data generated by the display data generating unit 145 is displayed by the display control unit 146.

The display data generating unit 145 includes a virtual map information generating unit. This virtual map information generating unit is a module that generates virtual map information M2 including coordinate information for fantasy blocks and the characters of other users in virtual geographic information corresponding to geographic information in the real map information M1 as shown in FIG. 2 based on game progress according to the game progress processing unit 141. The virtual map information generating unit acquires geographic elements, buildings, roads and rail lines included in the real map information M1 stored in the memory 15 and real map information database 35a in the network, references mapping data stored in the memory 15 and game database 35c, and generates map information for a virtual world based on map information for the virtual world corresponding to real map information M1, the characteristics of characters and objects, information for event processing, and graphics information. In the example shown in FIG. 2, virtual objects such as forests, mountains, and rocks are arranged at coordinate positions (within coordinate ranges) corresponding to buildings in the real map information M1.

In the present embodiment, virtual map information M2 is generated by a virtual map information generating unit in a smartphone 1, but the virtual map information managing unit 37 in the game server 3 may generate virtual map information M2 for geographic information in the real map information M1 beforehand or in real time, and this may be distributed and synchronized with each smartphone 1 by the game data distributing unit 34.

The display control unit 146 is the module that executes the controls to display real world display data generated by the display data generating unit 145 alone or selectively superimpose and display real world display data with some or all of the virtual display data. The display unit 13a displays real world display data and virtual display data under the control of the display control unit 146.

The display control unit 146 in the present embodiment also includes a route display unit. The route display unit is a module that displays the travelling route of the user recorded by the travel route recording unit 144a, the traveling route of other users, and the traveling route of any object as routes on real map information M1 or virtual map information M2. The route display by the route display unit can be travelling routes of a predetermined width and color created by connecting adjacent pairs of points by the shortest distance, or can be travelling routes of a predetermined width and color created by connecting adjacent pairs of points along a route referenced using geographic information. In routes displayed by the route display unit, an object or sector near the traveling routes of each user or object can be displayed in a different color on real map information M1 or virtual map information M2.

These sectors can be displayed in different colors in the form of block units for administrative districts, municipal districts, prefectures, and municipalities based on actual geographic information or virtual geographic information. The color of each block unit can be determined based on contact with a traveling route created by connecting adjacent pairs of points by the shortest distance or based on contact with a traveling route created by connecting adjacent pairs of points along a route referenced using geographic information.

The display data generating unit 145 in the present embodiment is a module in the virtual map information display system including, as shown in FIG. 12, a related information display unit 145a, a virtual display data generating unit 145b, a synthesis processing unit 145d, and a status display unit 145e.

The virtual display data generating unit 145b is a module that generates virtual display data such as computer graphics to be superimposed on real map information M1. Virtual display data is generated based, for example, on location information acquired from the location information acquiring unit 144 so that virtual blocks B0, which are virtual objects, are displayed on top of real map information M1 forming the underlying layer. The virtual display data generated in this way is inputted to the synthesis processing unit 145d.

In the present embodiment, the shape and area of fantasy blocks created by the virtual display generating unit 145b automatically change based on the traveling speed of the user through the virtual world, the traveling speed of the user through the real world, and the density of information in real map information or virtual map information. In other words, as shown in FIG. 9, boundary lines in real map information are selected to form areas and shapes corresponding to the current location of the user in the real world and the density of information in the real map information M1 corresponding to the current location of the user, and fantasy blocks with a closed linear shape are generated. For example, roads, rivers, topographical lines, administrative district lines for cities, towns and villages, district lines and other lines in the area adjacent to existing fantasy blocks are selected in order to determine the area and shape based on the density of information, and connecting intersection points are selected to define a closed linear shape connected to existing virtual blocks, and a fantasy block is generated. In this way, the area of division units can be reduced in areas with a high information density per unit area such as urban areas with lots of buildings and stores, and the area of division units can be increased in areas with a low information density per unit area such as suburban and exurban areas.

The related information display unit 145a is a module that visibly displays text information related to geographic information in real map information M1 corresponding to the displayed location of a virtual object in, for example, real map information M1 on top of the virtual object. In the present embodiment, this includes a map information extracting unit 145c.

The map information extracting unit 145c retrieves text information associated with coordinate positions in real map information M1 corresponding to a virtual object from the real map information database 35a. The related information display unit 145a converts the retrieved text information into image information and inputs the image information to the synthesis processing unit 145d.

The synthesis processing unit 145d is a module that superimposes and displays virtual objects generated by the virtual display data generating unit 145b on real map information M1. More specifically, the synthesis processing unit 145d displays fantasy blocks B0, which are virtual objects, on an image whose underlying layer is real map information M1, and then superimposes and synthesizes text information inputted from the related information display unit 145a as images in the fantasy blocks B0.

The status display unit 145e is a module that displays changes in the status of each fantasy block B0 forming a single virtual object. Here, a fantasy block B0 is a displayed graphic corresponding to geographical information in the real world. In the present invention, it appears on the game screen with a flat shape corresponding to geographic information in the real world and covering some or all of a municipal unit in the real map information M1. A fantasy block B0 appears in an inactive state in the real map information M1 along a route traveled by the user in the real world and transitions to an active state in response to a user selection operation.

The status display unit 145e groups areas as sets of virtual blocks B0 displayed on the screen and displays the proportion of virtual blocks B0 whose status has changed in each area. In FIG. 7, for example, the status display unit 145e changes the scale of real map information M1 displayed on the screen in response to user operations, such as a pinch-in operation (FIG. 7(a)) or pinch-out operation (FIG. 7(b)) performed on the touch panel of a smartphone. This changes the size of the area based on the quantity of virtual blocks B0 displayed on the screen in accordance with the change of scale to display the proportion of occupied blocks in the changed area.

In the present embodiment, the occupancy rate in an area (here, the completion rate in each area) is indicated by an arc-shaped gauge along with a percentage as shown in the round gauge graphs G1-G3 displayed in each area in FIG. 7(a) to (c). These round gauge graphs G1-G3 are graphs that display information for each area corresponding to the location of each area in the range displayed on the screen, and are displayed at the coordinate information corresponding to the longitude and latitude of each area in real map information or virtual map information. For example, when a gauge graph G2 is displayed at the city ward level as shown in FIG. 7(b), a pinch-in operation performed by the user reduces the scale of the map and increases the range displayed on the screen. As shown in FIG. 7(a), the activation rate for fantasy blocks B0 belonging to a wide area at the prefectural level shown on the screen is displayed in graph gauge G1. A pinch-out operation performed by the user increases the scale of the map and reduces the range displayed on the screen. As shown in FIG. 7(c), the activation rate for fantasy blocks B0 belonging to a narrow area at the neighborhood level shown on the screen is displayed in graph gauge G3.

In other words, the status display unit 145e groups fantasy blocks B0 and defines areas in stages according to specific attributes. For example, in FIG. 8, the attributes are the national and island level (Honshu, Kyushu, Okinawa, etc.), the regional level (Tohoku, Chubu, Kitakyushu, etc.), the prefectural level, and the municipal level. The proportion of fantasy blocks B0 with a specific status, for example, a status that has changed from inactive to active status or vice versa is displayed for each group quantitatively as an occupancy rate or completion rate by grouping. Status display data indicating the status of a grouping is inputted to the display control unit 146 and gauge graphs G1-G3 are displayed on the display unit 13a as appropriate based on the size indicated by a user operation.

(Operation of the System)

The present embodiment has an object control function in which points Tp obtained by a traveling user are spent to move a character C1 along a traveling route on a virtual map, and the traveling route and fantasy blocks corresponding to spent points Tp are recorded and displayed. Also, event processing is performed so that monsters appear and are defeated in fantasy blocks. In response, points Tp are accumulated, the fantasy area expands, and the location-based game progresses. The following is an explanation of each process.

(1) Game Progress Processing

The basic concept behind the location-based game in the present embodiment is that movement by a user through the real world is linked to the movement of a character through a virtual world and blocks along the traveled route are turned into fantasy blocks by an object control function. For example, the game is premised on the idea that points are awarded based on a proportional relationship to the straight distance or route traveled by a user through the real world, the character's movement through the virtual world is proportional to the distance traveled by the user, and fantasy blocks are generated by spending points awarded to the user. In the location-based game in the present system, points Tp are issued based on the distance traveled by the user through the real world, points Tp are spent as the character C1 corresponding to the user moves through an enhanced real world or a virtual world, fantasy blocks corresponding to municipal districts are generated, events are generated such as monsters appearing and being defeated in fantasy blocks, and the game progresses.

More specifically, a point issuing unit 38 is provided in the game server 3, and points are issued corresponding to the distance traveled by the user 10 as detected by the location information acquiring unit 144 in a smartphone 1. Here, the points represent information with transactional value and are treated as virtual currency units in the game. In the present embodiment, how a character C1 moves through a virtual world or the result of movement of the character through the virtual world depends on the number of points. For example, event processing occurs in which fantasy blocks appear on a map and items are acquired at the actual pace of a walking character C1, and the game progresses. Game progress including the issuing of points and event processing is performed by the game progress processing units 36, 141 working together, and progress in the game and points are recorded in the user database 35b or game database 35c.

In the present invention, points Tp are issued based on the distance actually traveled by the user 10 in real map information M1, and points Tp are spent to move the character C1 corresponding to the user 10 in virtual map information M2 and turn blocks B0 adjacent to the route traveled into fantasy blocks. As shown in FIG. 5(a) and FIG. 5(b), blocks B0 conforming to the shape of municipal districts adjacent to the route on the screen are touched by the user, and the touched blocks B0 become fantasy blocks. Each block B2-B5 in the virtual map information is displayed so as to overlap a municipal district on a real map M1.

In the present embodiment, points are earned based on the cumulative distance traveled by the user, the number of times specific facilities have been accessed on a map, and the number of times specific fantasy areas have been visited. For example, as shown in FIG. 13, points Tp are awarded based on the number of times a user 10 has traveled between the user's resistance (point A) and place of work Bld, and these points Tp are spent to generate fantasy blocks. In other words, fantasy blocks are generated between point A and building Bld by spending points Tp, and a fantasy block is superimposed on a real map by touching the block. In the present embodiment, points acquired in fantasy areas can also be used to generate fantasy blocks in unexplored blocks B0u as shown in FIG. 14(a) to FIG. 14(c).

In the present embodiment, the color darkens and the status of fantasy blocks changes each time the route between the resistance and place of work is traveled. The number of times specific facilities (such as the building Bld) are accessed (going back and forth) is counted when the route traveled is recorded, and points are issued based on this count. The points are then used to experience various special events. These special events include spending points to generate fantasy blocks in unexplored blocks and acquiring special items.

In the present embodiment, the status of fantasy blocks changes over time or as the game progresses. To be more specific, as shown in FIG. 6(a) and FIG. 6(b), points Tp are issued based on the distance traveled by the user 10, and the points Tp are spent to move the character C1 corresponding to the user 10 on a real map M1. As the character C1 moves, blocks corresponding to municipal districts along the route traveled enter a standby state (untouched state) to be touched by the user. The user can touch an untouched block on the screen to activate the block and turn it into a fantasy block (Phase F1). Points Tp are spent each time a block is turned into a fantasy block. As the user moves, the range in which untouched blocks appear and the width of the route traveled widens or narrows depending on the level of the user, the number of points Tp accumulated, and the traveling speed of the user.

The status of these fantasy blocks changes, as shown in FIG. 6(b), as time passes and as the game progresses. As the character C1 travels, blocks adjacent to the route traveled are untapped blocks B1 whose real map information M1 remains blank. When an untapped block B1 is touched in a "local tap operation," it becomes a fantasy block or activated block B2 (Phase F1). Then, by spending points Tp, unexplored blocks can be touched in a "remote district tap operation" to turn unexplored blocks B6 some distance from the route traveled into fantasy blocks (Phase F6). Unexplored blocks B6 turned into fantasy blocks using a remote district tap operation are displayed using images that differ from those used to turn blocks into fantasy blocks using a local tap operation.

Activated blocks B2 turned into fantasy blocks then transition to upgraded fantasy blocks B3 with the passage of time, for example, trees in a forest grow and begin to sparkle (Phase F2). The forest can also transition to a sparkling state without the passage of time by using a "growth portion" acquired by spending points Tp. In the activated block B3 that has been upgraded and has begun to sparkle, an event can be generated such as cutting down the forest and harvesting the lumber by tapping on the block. Points and items are acquired by this event, and the block is reset to become an inactive block B4 (Phase F3). A tapping operation on the inactive block B4 is then prohibited for a predetermined amount of time. It then cannot be turned onto a fantasy block for a predetermined amount of time and goes into standby mode. When the predetermined amount of time has elapsed, the inactive block B4 becomes an activated (but untapped) block B5 (Phase F4). When it is tapped, it becomes a fantasy block again and begins to grow (Phase F5). The fantasy block then transitions again by following the same cycle. This maintains gaming interest in areas that have already been explored.

(2) Virtual Map Display Processing

The following is an explanation of the enhanced reality display processing in the present embodiment. FIG. 2 to FIG. 9 show the steps in this enhanced reality display processing. In the present embodiment, as described above and as shown in FIG. 2, movement of a character on a virtual map M2 is linked with the movement of a user 10 on a real map M1, and sectors (such as municipal districts) along the route traveled are turned into fantasy blocks. A fantasy block B0 is virtual display data displayed as a virtually rendered object (virtual object) on a real map M1. A fantasy block B0 covers some or all of the real map M1, and the portion covered by the block B0 is displayed as a virtual object on a virtual map M2.

In the present embodiment, the virtual display data generating unit 145b generates virtual display data such as computer graphics to be superimposed on real map information M1. For example, the arrangement of fantasy blocks B0 forming a virtual object is generated as virtual display data to be placed on an underlying layer of real map information M1 based on the location information obtained by the location information acquiring unit 144.

Text information related to geographic information in real map information M1 at the displayed location of each fantasy block B0 is displayed visibly as related information on the fantasy block B0. To be more specific, as shown in FIG. 3, text information T1 such as a place name or administrative district name is displayed along with geographic information such as topography, buildings and roads in real map information M1. In FIG. 4, the character C1 is currently in "Town OO, 3rd District" in the real map information M1 and is surrounded by fantasy blocks.

As mentioned above, points Tp acquired by the user 10 are spent to move the character C1 corresponding to the user 10 through virtual map information M2 and generating fantasy blocks B0 along the route traveled. In the fantasy display, as shown in FIG. 5(a) and FIG. 5(b), the user touches a block B0 formed in the shape of a municipal district adjacent to the route on the screen, and the block B0 is turned into a fantasy block. Each type of block B2-B5 on the virtual map is superimposed over a municipal district in real map information M1.

The status of these fantasy blocks changes, as shown in FIGS. 6(a) and (b), as time passes and as the game progresses. As the character C1 travels, blocks adjacent to the route traveled are untapped blocks B1 whose real map information M1 remains blank. When an untapped block B1 is touched in a "local tap operation," it becomes a fantasy block or activated block B2 (Phase F1). Then, by spending points Tp, unexplored blocks can be touched in a "remote district tap operation" to turn unexplored blocks B6 some distance from the route traveled into fantasy blocks (Phase F6). Unexplored blocks B6 turned into fantasy blocks using a remote district tap operation are displayed using images that differ from those used to turn blocks into fantasy blocks using a local tap operation.

The change in the status of a fantasy block B0 is displayed by the status display unit 145e. In other words, the status display unit 145e groups fantasy blocks B0 and defines areas in stages according to specific attributes. For example, in FIG. 8, the attributes are the national and island level (Honshu, Kyushu, Okinawa, etc.), the regional level (Tohoku, Chubu, Kitakyushu, etc.), the prefectural level, and the municipal level. The proportion of fantasy blocks B0 with a specific status, for example, a status that has changed from inactive to active status or vice versa is displayed for each group quantitatively as an occupancy rate or completion rate by grouping.

In the grouping operation, the breadth of range can be set in stages and the scale of the range can be changed based on a user selection operation. Among the fantasy blocks belonging to a changed grouping, the proportion of fantasy blocks of a predetermined status are successively displayed. In the example shown in FIG. 8(a), fantasy blocks are grouped by neighborhood (e.g., Ginza and Kyobashi), and the percentage of activated blocks is displayed for each group. In FIG. 8(b), fantasy blocks grouped by neighborhood (e.g., Ginza and Kyobashi) are displayed at the next higher level of city ward (e.g., Chuo Ward), and the percentage of activated blocks is displayed for each group. In FIG. 8(c), fantasy blocks are displayed at the even larger scale of prefecture (e.g., Tokyo), and the percentage of activated blocks is displayed for this group.

In the example depicted in this figure, groupings at a narrower, lower level are increased in successive order to groupings at a broader, higher level, and the proportion of particular blocks in each grouping is displayed at each stage. Here, three blocks have been activated, and these blocks represent 37.5% of the blocks in the Ginza grouping, 3% of the blocks at the next higher and broader grouping of Chuo Ward, and 1% of the blocks at the next higher and broader grouping of Tokyo. Even broader groupings can be created, such as Kanto, Honshu, Japan and Asia, and the proportion of particular blocks at these stages can be displayed as well.

The shape and area of fantasy blocks created by the virtual display generating unit 145*b* automatically change based on the traveling speed of the user through the virtual world, the traveling speed of the user through the real world, and the density of information on a real map or virtual map. In other words, as shown in FIG. 9, boundary lines in real map information are selected to form areas and shapes corresponding to the current location of the user in the real world and the density of information in the real map information M1 corresponding to the current location of the user, and fantasy blocks with a closed linear shape are generated.

(3) Point Issuing Process

FIG. 15 is a flowchart showing the steps in the point issuing process performed in the present embodiment. As shown in the figure, the smartphone 1 held by the user 10 executes a location information acquiring process and traveling speed calculating process continuously or at regular intervals while the game program is being run, and reports this information to the game server 3 (S101). More specifically, the location information acquiring unit 144 acquires location information based on values detected by an accelerometer 16, from satellites in the global positioning system (GPS), base station positioning using triangulation based on the radio field intensity and information from base stations, and Wi-Fi positioning using the Wi-Fi SSID (Service Set ID) and a database combining radio wave conditions with longitude and latitude.

The game server 3 receives location information reports from user terminals, records the cumulative route of each user (S201), and calculates and records the amount of travel (cumulative distance traveled) by each user. Until the amount of travel exceeds a predetermined value, recording of the cumulative route continues ("N" in S202). When the predetermined value for amount of travel has been reached ("Y" in S202), the number of points corresponding to the amount of travel is used as information with exchange value (S203). The issued points are then downloaded into the user's smartphone 1 (S102).

The character C1 is moved on the virtual map information M2 (S104) or points are collected on the user's smartphone 1 in accordance with the number of points received. As the user 10 moves, points are repeatedly issued ("N" in S103). When the number of points exceeds a predetermined level ("Y" in S103), unexplored blocks along the route traveled can be turned into fantasy blocks, items can be acquired, or special events can be experienced (S105). Special events can be selected based on the number of points. Here, the user can select and execute any special event that is available simply by requesting it. The request is activated based on event processing corresponding to the number of points.

When the user has selected an event, the event is activated. When the user performs a tapping operation, an adjacent block or unexplored block is turned into a fantasy block (S105), and the results are reported to the game server 3. The game server receives the event activation report and advances the game based on the activated event (S204). The issuing, collection, and use of points is repeated ("Y" in S106 and S205) until the game is ended ("N" in S106 and S205).

(4) Batch Input Operation Processing

The following is an explanation of the batch input processing performed during an event. In the present invention, the game progress processing unit 141 executes an event such as encountering and battling a monster when, for example, the user's character approaches a monster M0 in a fantasy block.

The game progress processing unit 141 in the present embodiment includes an input interface control function that performs a single batch exit operation for all monsters in an event when monsters are encountered and event processing occurs. The game progress processing unit 141 usually executes an individual input step based on user input for each object (monster M0, etc.) appearing in a regular event. However, the individual input step can be replaced by user choice with a batch exit operation step in which a single batch exit operation is performed collectively for a plurality of monsters. When all monsters are processed using a single batch exit operation, the game proceeds as if the event has already been performed. Here, the individual input usually performed is to quickly swipe the touch panel for each monster encountered in battle and to input a symbol for every type of monster encountered on the touch panel such as o, x and Δ.

However, in a batch end operation, the smartphone 1 can be tilted to eliminate all monsters not appearing on the screen, the smartphone 1 can be shaken to cause all monsters to experience a death shock, or a noise like a blast of wind can be made by breathing into the microphone. Each monster to be processed has a set amount of life points or a certain level that must be reached to end the process. When a batch end operation is performed only those monsters that exceed this threshold are defeated. The rest of the monsters require individual input to be defeated.

The following is a more detailed explanation of the batch input process. FIG. 16 is a sequence diagram showing the operations related to event processing. First, as a game progresses, location information is periodically acquired by each smartphone 1 and sent to the game server 3 (S401 and S301). The game server 3 issues points based on the distance traveled by each reporting user (S302) and the issued points are sent to the user's smartphone 1 (S303). The smartphone 1 receives the points and uses the points for user operations such as moving the character C1 on a virtual map and turning blocks into fantasy blocks (S402).

When battle event processing is to be performed ("Y" in S403) and the user selects batch processing ("Y" in S404), individual processing is ended and the event proceeds as a batch end operation. When the user does not select batch processing, standard individual input is performed (S406). Here, batch processing can be executed by user selection. However, when, for example, the current location and current speed of a smartphone 1 as acquired by the location information acquiring unit 144 are being monitored, and the speed of the user is currently exceeding a predetermined value, batch processing may be forcibly executed during event processing. In this case, the game progress processing unit 141 forcibly selects batch end processing instead of allowing for individual operations in an event allowing for batch processing. Here, individual input operations are eliminated, the battle is ended, and the game progresses. When the traveling speed of the user exceeds a predetermined value, the level of monsters encountered in a battle may also be lowered or the success rate at the end of the batch operation increased.

When batch processing is performed ("Y" in S404) and all monsters have been eliminated ("Y" in S405) in event processing, the synchronization processing unit 142 notifies the game progress processing unit 141 in the game server 3 (S407), the game server 3 performs synchronization (S304), and the results of the executed event processing are reflected in the game progress processing (S305). When batch processing has not been selected in Step S404 ("N" in S404) or all monsters have not been eliminated by batch processing ("N" in S405), individual input is received (S406) and the battle continues in the usual manner. When the battle has ended, the results are sent to the server and synchronization is performed (S407). A report is received by the game server 3, which performs synchronization (S304) and the results of the battle are reflected in subsequent game progress processing (S305).

This processing is repeated until the game is ended ("N" in S408), and the game is ended when no game processing operations have been performed ("Y" in S408). The description of the present embodiment provided above is an example of the present invention. Therefore, the present invention is not limited to the present embodiment, and various modifications are possible based on the design without departing from the technical concept of the present invention.

(Operations and Effects)

In the location-based game of the present embodiment, as explained above, a character corresponding to the user and other objects move through a virtual world and various events occur as the game progresses. In this game, the relationship between the real world and the virtual world is readily grasped, which increases user convenience and enhances user enjoyment.

In the present embodiment, as shown in FIG. 8, fantasy blocks are groups in ranges of a predetermined breadth. The scale of each range can be changed in stages based on user selection operations, and the proportion of fantasy blocks of a predetermined status are displayed in successive order at each stage. This can enhance enjoyment of the game, create a sense of achievement, and provide motivation.

In the present embodiment, as shown in FIG. 5(a) and FIG. 5(b), the user touches a block B0 formed in the shape of a municipal district adjacent to the route on the screen, and the block B0 is turned into a fantasy block. Each type of block B2-B5 on the virtual map is superimposed over a municipal district in real map information M1. Each block appearing on the real map along the route traveled by the user in the real world first appears as an inactive block. Each block can be selected by the user to render it active. In the interface, the user performs operations while traveling, enhancing game enjoyment.

In the present embodiment, as shown in FIG. 9, boundary lines in real map information are selected to form areas and shapes corresponding to the current location of the user in the real world and the density of information in the real map information M1 corresponding to the current location of the user, and fantasy blocks with a closed linear shape are generated. In this way, the area of division units can be reduced in areas with a high information density per unit area such as urban areas with lots of buildings and stores, and the area of division units can be increased in areas with a low information density per unit area such as suburban and exurban areas. When a game is constructed by combining elements of the real world with elements of a virtual world, the balance between real world information and virtual world information can be optimized, the number of user operations and events occurring can be stabilized, and enjoyment of the game can be enhanced.

REFERENCE SIGNS LIST

B0: Block
B0u: Block
B1: Untapped block
B2: Activated block
B3: Upgraded activated block
B4: Inactive block
B5: Activated (untapped) block
B6: Unexplored block
B1d: Building
C1: Character
G1-G3: Gauge graphs
M0: Monster
M1: Real map information
M2: Virtual map information
Tp: Point
1: Smartphone
2: Internet
3: Game server
10: User
11: Communication interface
12: Input interface
12a: Touch panel
13: Output interface
13a: Display unit
14: Application executing unit
15: Memory
16: Accelerometer
21: Satellite
22: Wireless base station
31: Communication interface
32: Location information managing unit
33: Authenticating unit
34: Game data distributing unit
35a: Real map information database
35b: User database
35c: Game database
35d: Point database
36: Game progress processing unit
37: Virtual map information managing unit
38: Point issuing unit
141: Game progress processing unit
142: Synchronization processing unit
143: Event processing unit
144: Location information acquiring unit
144a: Travel route recording unit
145: Display data generating unit
145a: Related information display unit
145b: Virtual display data generating unit
145c: Map information extracting unit
145d: Synthesis processing unit
145e: Status display unit
146: Display control unit

The invention claimed is:

1. A memory coupled to a processor configured to provide an interface system for a location-based game in which a game progresses in a virtual world based on movement by the user through the real world, the interface system comprising:

a virtual display data generating unit configured to generate virtual objects as the game progresses with movement by the user;

a synthesis processing unit configured to superimpose and display the generated virtual objects on real map information; and a status display unit configured to display changes in statuses of the generated virtual objects corresponding to a user selection operation on a screen;

wherein the generated virtual objects are displayed according to geographic information in the real world and the statuses of the generated virtual objects change as the game progresses, and the status display unit defines an area by a set of the generated virtual objects displayed on the screen and further displays a proportion of the area occupied by the generated virtual objects whose status has changed.

2. The memory coupled to a processor configured to provide the interface system for a location-based game according to claim 1, wherein the status display unit is configured to change a scale of real map information displayed on the screen based on user operations, and configured to change a size of the area based on a quantity of generated virtual objects displayed on the screen in accordance with the change of scale.

3. The memory coupled to a processor configured to provide the interface system for a location-based game according to claim 2, wherein the generated virtual objects are blocks having a flat shape corresponding to geographic information in the real world and cover some or all of the real map information in municipal district units, the blocks appear in an inactive state on the real map information along a route traveled by a user in the real world and transition to an active state based on a user selection operation, and the status display unit displays the inactive status or active status as a change in state.

4. The memory coupled to a processor configured to provide the interface system for location-based gaming according to claim 1, further comprising a game progress processing unit configured to generate an effect of a character moving through the virtual world or being moved through the virtual world based on:
- a current location of the user according to location information of the user acquired from a location information managing unit; and
- a number of points in possession of the user.

5. The memory coupled to a processor configured to provide the interface system for location-based gaming according to claim 3, wherein an inactive status or an active status of the generated virtual objects are transitioned according to game progress or time lapses.

6. A memory coupled to a processor configured to provide an interface program for a location-based game in which a game progresses in a virtual world based on movement by the user through the real world, the interface program causing a computer to function as:
- a virtual display data generating unit configured to generate virtual objects as the game progresses with movement by the user;
- a synthesis processing unit configured to superimpose and display the generated virtual objects on real map information; and
- a status display unit configured to display changes in statuses of the generated virtual objects corresponding to a user selection operation on a screen;

wherein the generated virtual objects are blocks having a flat shape corresponding to geographic information in the real world and cover some or all of the real map information in municipal district units, and the status display unit groups virtual objects by predetermined attributes and displays the proportion of an area occupied by the generated virtual objects whose status has changed in each group quantitatively by grouping.

7. An interface control method for a location-based game in which a game progresses in a virtual world based on movement by the user through the real world, wherein the interface control method is executed on a processor coupled to a memory, the interface control method comprising the steps of:

generating virtual objects as the game progresses with movement by the user;

superimposing and displaying the generated virtual objects on real map information; and displaying changes in the status of the generated virtual objects corresponding to a user selection operation;

wherein the generated virtual objects are blocks having a flat shape corresponding to geographic information in the real world and cover some or all of the real map information in municipal district units, and the status display unit groups virtual objects by predetermined attributes and displays a proportion of an area occupied by the generated virtual objects whose status has changed in each group quantitatively by grouping.

* * * * *